(12) United States Patent
Goellner et al.

(10) Patent No.: US 12,202,665 B2
(45) Date of Patent: Jan. 21, 2025

(54) PHASE CHANGE MATERIAL PANEL AND PASSIVE THERMALLY CONTROLLED SHIPPING CONTAINER EMPLOYING THE PANELS

(71) Applicant: Pelican BioThermal, LLC, Plymouth, MN (US)

(72) Inventors: Kai Goellner, Saint Paul, MN (US); Jason John Miller, Hudson, WI (US)

( * ) Notice: Subject to any disclaimer, the term of this patent is extended or adjusted under 35 U.S.C. 154(b) by 203 days.

(21) Appl. No.: 17/376,927

(22) Filed: Jul. 15, 2021

(65) Prior Publication Data
US 2023/0017903 A1 Jan. 19, 2023

(51) Int. Cl.
| | | |
|---|---|---|
| *B65D 81/38* | (2006.01) | |
| *F25D 3/06* | (2006.01) | |
| *F25D 3/08* | (2006.01) | |
| *F25D 11/00* | (2006.01) | |

(52) U.S. Cl.
CPC ........... *B65D 81/3825* (2013.01); *F25D 3/06* (2013.01); *F25D 3/08* (2013.01); *F25D 11/003* (2013.01); *F25D 11/006* (2013.01); *F25D 2303/00* (2013.01); *F25D 2303/08* (2013.01); *F25D 2303/082* (2013.01); *F25D 2303/0831* (2013.01)

(58) Field of Classification Search
CPC ........... F25D 2303/00–085; F25D 3/06; F25D 11/006; F25D 3/08; F25D 11/003; B65D 81/3825; A61J 1/165; A61D 19/025
See application file for complete search history.

(56) References Cited

U.S. PATENT DOCUMENTS

| | | |
|---|---|---|
| 1,936,214 A | 11/1933 | Sommers |
| 2,496,296 A | 2/1950 | Lobl |
| 3,077,426 A | 2/1963 | Johnston |
| 3,093,259 A | 6/1963 | Morrison |
| 3,236,206 A | 2/1966 | Willinger |
| 3,570,699 A | 3/1971 | Kobayashi |
| 3,786,613 A | 1/1974 | Shepheard |
| 3,810,367 A | 5/1974 | Peterson |
| 3,974,658 A | 8/1976 | Starrett |

(Continued)

FOREIGN PATENT DOCUMENTS

| | | |
|---|---|---|
| DE | 19915311 A1 | 10/2000 |
| DE | 10305550 A1 | 8/2004 |

(Continued)

OTHER PUBLICATIONS

English language translation of WO 2022/028856. Translated May 2023 (Year: 2022).*

(Continued)

*Primary Examiner* — Cassey D Bauer
(74) *Attorney, Agent, or Firm* — Sherrill Law Offices, PLLC

(57) ABSTRACT

A phase change thermal storage unit having has at least one conformational feature selected from (i) a fill port located proximate a corner of the of the panel, (ii) internal contouring that alters the thickness of the phase change material retention chamber for creating an average thickness of the chamber within a central portion of the chamber which is less than the average thickness of the chamber within a peripheral portion of the chamber, and (iii) fingertip indentation handles proximate each and every edge.

12 Claims, 3 Drawing Sheets

(56) References Cited

U.S. PATENT DOCUMENTS

| | | |
|---|---|---|
| 4,044,449 A | 8/1977 | Phan |
| 4,145,895 A | 3/1979 | Hjertstrand et al. |
| 4,147,004 A | 4/1979 | Day et al. |
| 4,319,629 A | 3/1982 | Hotta |
| 4,324,111 A | 4/1982 | Edwards |
| 4,527,370 A | 7/1985 | Schuette |
| 4,529,638 A | 7/1985 | Yamamoto et al. |
| 4,688,398 A | 8/1987 | Baek |
| 4,877,128 A | 10/1989 | Strickland |
| 4,892,226 A | 1/1990 | Abtahi |
| 4,923,077 A * | 5/1990 | Van Iperen ............ F25D 3/00 220/592.01 |
| 4,931,333 A | 6/1990 | Henry |
| 5,032,439 A | 7/1991 | Glicksman et al. |
| 5,050,387 A | 9/1991 | Bruce |
| 5,088,301 A | 2/1992 | Piepenbrink |
| 5,093,175 A | 3/1992 | Goto et al. |
| 5,226,557 A | 7/1993 | Nelson |
| 5,435,142 A | 7/1995 | Silber |
| 5,441,170 A | 8/1995 | Bane, III |
| 5,562,228 A | 10/1996 | Ericson |
| 5,756,179 A | 5/1998 | Jutte |
| 5,758,513 A | 6/1998 | Smith |
| 5,840,080 A | 11/1998 | Der Ovanesian |
| 5,848,508 A | 12/1998 | Albrecht |
| 5,875,599 A | 3/1999 | McGrath et al. |
| 5,897,932 A | 4/1999 | McGrath et al. |
| 5,899,088 A | 5/1999 | Purdum |
| 5,924,302 A | 7/1999 | Derifield |
| 5,979,693 A | 11/1999 | Bane, III |
| 6,164,030 A | 12/2000 | Dietrich |
| 6,168,040 B1 | 1/2001 | Sautner et al. |
| 6,209,343 B1 | 4/2001 | Owen |
| 6,223,551 B1 | 5/2001 | Mitchell |
| 6,233,965 B1 | 5/2001 | Choy |
| 6,250,104 B1 | 6/2001 | Bostic |
| 6,266,972 B1 | 7/2001 | Bostic |
| 6,325,281 B1 | 12/2001 | Grogan |
| 6,412,545 B1 | 7/2002 | Buff et al. |
| 6,415,623 B1 | 7/2002 | Jennings et al. |
| 6,457,323 B1 | 10/2002 | Marotta |
| 6,467,323 B1 | 10/2002 | Narushima et al. |
| 6,474,095 B1 | 11/2002 | Chan |
| 6,502,417 B2 | 1/2003 | Gano, III |
| 6,658,857 B1 | 12/2003 | George |
| 6,666,032 B1 | 12/2003 | Rickson et al. |
| 6,718,776 B2 | 4/2004 | Wessling et al. |
| 6,761,041 B2 | 7/2004 | Roth et al. |
| 6,765,031 B2 | 7/2004 | Salyer et al. |
| 7,328,583 B2 | 2/2008 | Hillman et al. |
| 7,500,593 B2 | 3/2009 | Mayer |
| 7,721,566 B1 | 5/2010 | Wilken |
| 7,908,870 B2 | 3/2011 | Williams et al. |
| 7,950,246 B1 | 5/2011 | Mayer et al. |
| 7,963,397 B2 | 6/2011 | Seagle et al. |
| 8,250,882 B2 | 8/2012 | Mustafa et al. |
| 9,180,998 B2 | 11/2015 | Banks et al. |
| 9,751,682 B2 | 9/2017 | Mayer et al. |
| 2002/0050147 A1 | 5/2002 | Mai et al. |
| 2002/0114937 A1 | 8/2002 | Albert et al. |
| 2002/0134962 A1 | 9/2002 | Romero |
| 2002/0144482 A1 | 10/2002 | Henson et al. |
| 2004/0018335 A1 | 1/2004 | Best |
| 2004/0025528 A1 | 2/2004 | Gano, III |
| 2004/0074208 A1 | 4/2004 | Olson et al. |
| 2004/0079793 A1 | 4/2004 | Mayer |
| 2004/0079794 A1 | 4/2004 | Mayer |
| 2004/0180176 A1 | 9/2004 | Rusek, Jr. |
| 2004/0231355 A1 | 11/2004 | Mayer |
| 2005/0188714 A1 | 9/2005 | Wallace |
| 2005/0241978 A1 | 11/2005 | Plue et al. |
| 2006/0168985 A1 | 8/2006 | Gano |
| 2007/0055325 A1 | 3/2007 | Worm |
| 2007/0186577 A1 | 8/2007 | Goncharko |
| 2007/0271947 A1 | 11/2007 | Hase et al. |
| 2008/0099492 A1 | 5/2008 | Mayer |
| 2008/0271402 A1 | 11/2008 | Gingras |
| 2008/0308452 A1 | 12/2008 | Eller |
| 2009/0039088 A1 | 2/2009 | Williams et al. |
| 2009/0078699 A1 | 3/2009 | Mustafa et al. |
| 2009/0230138 A1 | 9/2009 | Williams et al. |
| 2010/0326993 A1 | 12/2010 | Mayer et al. |
| 2011/0049164 A1 | 3/2011 | Banks et al. |
| 2011/0114513 A1 | 5/2011 | Miller |
| 2016/0075498 A1 | 3/2016 | Mayer et al. |
| 2016/0168518 A1 | 6/2016 | Roselle |
| 2018/0237285 A1 | 8/2018 | Tom et al. |

FOREIGN PATENT DOCUMENTS

| | | | |
|---|---|---|---|
| DE | 202007007394 U1 | 10/2007 | |
| EP | 0157751 A2 | 10/1985 | |
| EP | 1099646 A1 | 5/2001 | |
| EP | 1192093 B1 | 3/2003 | |
| EP | 1660310 A1 | 5/2006 | |
| EP | 1996053 A1 | 12/2008 | |
| EP | 2022727 A1 | 2/2009 | |
| EP | 2022728 A1 | 2/2009 | |
| EP | 2604955 * | 6/2013 | ............ F25D 3/08 |
| EP | 2876389 A1 | 5/2015 | |
| EP | 2221569 B1 | 6/2016 | |
| GB | 2086353 A | 5/1982 | |
| WO | 9324797 | 12/1993 | |
| WO | 9932374 | 7/1999 | |
| WO | 0040908 | 7/2000 | |
| WO | 0102268 | 1/2001 | |
| WO | 02081833 | 10/2002 | |
| WO | 2005067687 A2 | 7/2005 | |
| WO | 2006082433 A1 | 8/2006 | |
| WO | 2007103267 A2 | 9/2007 | |
| WO | 2008137883 A1 | 11/2008 | |
| WO | 2009019251 A1 | 2/2009 | |
| WO | 2009035661 A1 | 3/2009 | |
| WO | 2010055295 A1 | 5/2010 | |
| WO | 2020206371 A1 | 10/2020 | |
| WO | WO2022028856 * | 2/2022 | |

OTHER PUBLICATIONS

English language translation of EP 2604955. Translated Oct. 2023 (Year: 2013).*

Chapman, Tom. "Minnesota Thermal Science Awarded Special Forces Contract for "Factor VII" Combat Portable Container". Article. Jun. 27, 2017.

Verner, Carl. "Phase Change Thermal Energy Storage". Dissertation. May 1997.

Vaczek, David. "Transport Containers Go the Distance". Article PMPNews.com. Feb. 28, 2008.

Kulmburg, Peter et al. "Development of Cold Chain Containers for Investigation Medicinal Products". Presentation Coolchain Europe 2009, Brussels, Jan. 27-30, 2009.

* cited by examiner

PHASE CHANGE MATERIAL PANEL AND PASSIVE THERMALLY CONTROLLED SHIPPING CONTAINER EMPLOYING THE PANELS

BACKGROUND

Thermally labile goods are frequently transported or shipped in thermally insulated shipping containers, often with a thermally conditioned phase change material within the payload chamber of the container, to prevent spoilage, decomposition, deactivation, transformation, conversion, breakdown, denaturing, etc. of the thermally labile goods.

Numerous insulated shipping containers have been developed over the years, with those lined with vacuum insulated panels (VIP panels) and phase change material panels (PCM panels) generally providing superior temperature control over extended periods. A nonexhaustive list of United States Patents and Published Patent Applications disclosing such thermally insulated shipping containers lined with PCM panels include U.S. Pat. Nos. 1,936,214; 2,289,060; 2,781, 643; 2,961,116; 3,074,586; 3,093,259; 3,236,206; 3,262, 283; 3,327,882; 3,810,367; 4,145,895; 4,235,346; 4,292, 817; 4,319,629; 4,368,819; 4,425,998; 4,579,170; 4,688, 398; 4,923,077; 4,931,333; 5,226,557; 5,435,142; 5,626, 936; 5,669,233; 5,758,513; 5,875,599; 5,899,088; 5,924, 302; 5,979,693; 6,070,427; 6,116,042; 6,209,343; 6,220, 473; 6,244,458; 6,325,281; 6,666,032; 6,718,776; 6,714, 508; 6,761,041; 6,868,982; 6,875,486; 7,028,504; 7,147, 125; 7,257,963; 7,294,374; 7,328,583; 7,422,143; 7,500, 593; 7,908,870, and 7,950,246, United States Patent Application Publications 2002/0134962; 2002/0144482; 2002/0050147; 2004/0079793; 2004/0079794; 2005/ 0188714; 2005/189404; 2007/0186577; 2008/0135564; 2009/0078699; 2009/0078708; 2010/0064698; 2010/ 0072211; 2010/0314397; 2010/0326993; 2011/0114513 and 2011/0147391; and Published International Applications WO 99/32374; WO 2010/055295; 2010/136769 and 2011/ 046940, the disclosures of which are all incorporated by reference.

One issue common to all known commercially manufactured PCM panels is the presence of a substantial void volume headspace within the panels. Due to the absence of phase change material within the void volume headspace, as the phase change material melts, this headspace acts as a thermal bridge through the PCM panel. This greatly reduces thermal control within the entire payload chamber, and contributes to the creation to substantial temperature variances within the payload chamber as portions of the payload chamber proximate such thermal bridges can be several degrees warmer than the controlled target temperature within the balance of the payload chamber. Secondarily, substantial headspace adds to the volumetric makeup of a package which directly impacts shipping costs.

A long-felt need has existed for PCM panels that eliminate or at least minimize such void volume headspace thermal bridges across the panel and realize compound improvements in performance and volumetric efficiency to reduce shipping costs.

Another issue common to all known commercially manufactured PCM panels is the accelerated melting of frozen phase change material around the periphery of the PCM panel relative to the central core of the panel, particularly when the edges of the PCM panel are positioned at a corner of the shipping container. Such accelerated peripheral melting can produce peripheral margins filled with only liquid phase change material even though a substantial mass of frozen phase change material remains within the phase change material panel. Such liquid-filled peripheral margins are no longer capable of dissipating heat via phase change and therefore begin to act as a thermal bridge through the PCM panel.

A long-felt need has existed for PCM panels that eliminate or at least minimize the formation of peripheral thermal bridges caused by accelerated peripheral melting of the phase change material retained therein.

Yet another common issue associated with PCM panels is their poor handleability. PCM panels are typically arranged as a lining within a shipping container in edge abutting cuboidal fashion. Because the PCM panels must be thermally conditioned for each shipment cycle, they must be repeatedly removed from and reinserted into the shipping container. This tends to be an arduous task as PCM panels are generally heavy, bulky, cumbersome, unwieldly, and when in a thermally conditioned state cold and coated with condensation. Often times these characteristics limit utilization of the expedient practice of inserting and removing the panels by grasping an upper edge of the panel with a single hand and lowering or lifting the thus suspended panel.

A long-felt need has existed for PCM panels that are more handleable during the insertion and removal process.

SUMMARY OF THE INVENTION

A first aspect of the invention is a phase change thermal storage unit comprising a panel with edges that interface at corners, defines a chamber filled with a phase change material, and has at least one conformational feature selected from (i) a fill port in fluid communication with the chamber located proximate a corner of the of the panel, (ii) internal contouring of the panel that alters the thickness of the chamber for creating an average thickness of the chamber within a central portion of the chamber which is less than the average thickness of the chamber within a peripheral portion of the chamber, and (iii) fingertip indentation handles in at least one of the major faces of the panel proximate each and every edge.

A second aspect of the invention is a passive thermal controlled shipping container comprising a thermally insulated cuboidal shell defining a thermally insulated volume selectively accessible through an openable wall lined with a plurality of removable phase change thermal storage units in accordance with the first aspect of the invention.

A third aspect of the invention is a method of filling the panels of the phase change thermal storage units according to the first aspect of the invention with phase change material, comprising the steps of (i) filling the chamber of the panel with a phase change material through the fill port with the panel in a vertically upright position and the corner containing the fill port at the apex of the panel, and (ii) sealing the opening through the fill port. The phase change material in the chamber preferably leaves a void volume headspace within the chamber having a vertical depth sufficient to minimize spillage of phase change material during filling and sealing while leaving a void volume headspace that comprises less than 1% of the total volume of the chamber.

DETAILED DESCRIPTION OF A PREFERRED EMBODIMENT

Nomenclature

Figure 1:
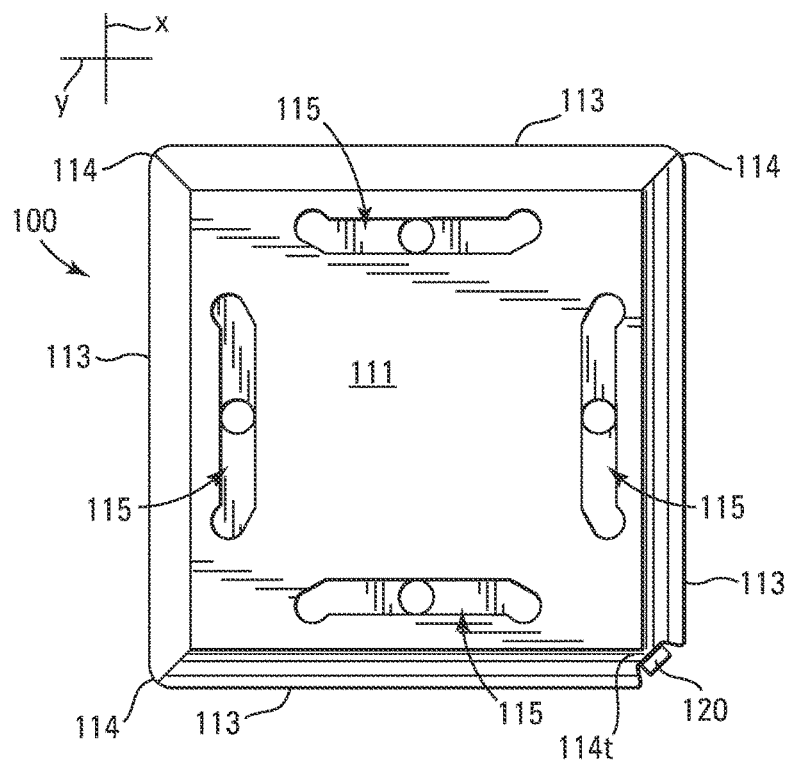
FIG. 1 is a top view of one embodiment of a phase change thermal storage unit in accordance with the invention.

100 Phase Change Material-Containing Panel/Phase Change Thermal Storage Unit/Heat Storage Element
110 Panel
110z Panel Central Transverse Axis
111 Front Wall of Panel
112 Back Wall of Panel
113 Edges of Panel
114 Corners of Panel
114t Truncated Corner of Panel
115 Fingertip Indentation Handle
119 Chamber defined by the Panel
119i Imaginary Boundary Separating Central Portion of Chamber from Peripheral Portion of Chamber
$119_0$ Volumetric Center of Chamber
$119_1$ Central Portion of Chamber
$119_2$ Peripheral Portion of Chamber
119v Total Volume of Chamber
$119v_1$ PCM Occupied Portion of Total Volume
$119v_2$ Headspace Portion of Total Volume
119z Transverse Thickness of Chamber
120 Fill Port on Panel
121 Base of Fill Port
129 Fill Port Channel
129a Channel Axis
130 Phase Change Material
130t Top Surface of Phase Change Material
200 Passive Thermal Controlled Shipping Container
210 Shell
220 Thermal Insulation Panels
229 Thermally Insulated Volume
239 Passive Thermal Controlled Payload Chamber
x Direction of Length (Longitude)
y Direction of Width (Lateral)
z Direction of Height or Thickness (Transverse)

Definitions

As utilized herein, including the claims, the term "cuboidal" means a three dimensional six sided shape in which the six sides are rectangular.

As utilized herein, including the claims, the term "generally cuboidal" means a three dimensional six sided panel shape in which the two major surfaces of the shape are rectangular and the four surfaces of the shape defining the thin dimension of the shape may or may not be rectangular.

As utilized herein, including the claims, the term "headspace" means the gas phase volume above a liquid or solid in a closed container.

As utilized herein, including the claims, the term "heat sealed" means sealed using heat and pressure, and includes specifically but not exclusively, hot bar sealing and spin welding.

As utilized herein, including the claims, the term "panel" means an element having a thin dimension.

As utilized herein, including the claims, the phrase "phase change material" means a material capable of repeated thermal-induced changes between a solid form and a liquid form.

As utilized herein, including the claims, the phrase "fill port" means an opening in a container for admitting a fluid.

As utilized herein, including the claims, the phrase "base of the fill port" means the end of the lumen defined by the fill port closest to the volume of the container to be filled with a fluid admitted through the fill port.

As utilized herein, including the claims, the phrase "fingertip indentation handle" is an indentation in an exterior facing surface of an item, shaped to accommodate insertion of at least one fingertip into the indentation and lifting of the item using only the inserted at least one fingertip.

As utilized herein, including the claims, the term "passive" means without a power source (i.e., without operation of an electric motor or a combustion engine).

As utilized herein, including the claims, the term "removable" means capable of removal without damage or destruction of the element removed or any item from which the element is removed.

As utilized herein, including the claims, the phrase "substantially orthogonal" means an angle of 90°±10°.

As utilized herein, including the claims, the phrases "thermal insulation" means a material that is a poor thermal conductor, such as foamed plastic and vacuum insulating panels.

As utilized herein, including the claims, the phrase "truncated corner" means a corner in which the corner point has been cut and replaced with a plane.

As utilized herein, including the claims, the phrase "vertically upright" in reference to a panel means the thin dimension of the panel is perpendicular to the direction of gravitational force.

As utilized herein, including the claims, the phrase "volumetric center" means the center of a given volume.

As utilized herein, including the claims, the phrase "average thickness" for a given area under consideration means the thickness of each point within the area under consideration times the area having that thickness divided by the total area. For example, the average thickness of a 20 cm long, 20 cm wide and 2 cm thick chamber having a 10 cm by 10 cm center portion with a decreased thickness of 1 cm is the area having a thickness of 2 cm [(20 cm)(20 cm)−(10 cm)(10 cm)=300 cm$^2$] multiplied by the thickness of that area (2 cm) plus the area having a thickness of 1 cm [(10 cm)(10 cm)=100 cm$^2$] multiplied by the thickness of that area (1 cm) divided by the total area [(20 cm)(20 cm)=400 cm$^2$].

Average Thickness=((300 cm$^2$)(2 cm)+(100 cm$^2$)(1 cm))/400 cm$^2$=1.75 cm.

Construction

Phase Change Thermal Storage Unit 100

Figure 4:
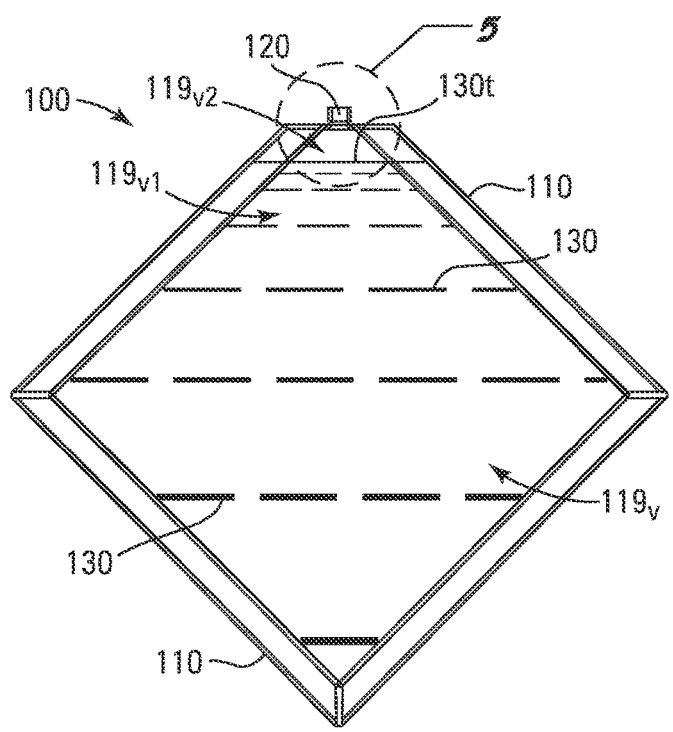
FIG. 4 is a top view of the phase change thermal storage unit depicted in FIG. 1 with the front wall removed to allow viewing of the phase change material and headspace volume therein.

Referring to FIG. 4 the invention is directed to a phase change thermal storage unit 100. The phase change thermal storage unit 100 is a panel 110 defining a chamber 119. The chamber 119 has a total volume 119v which is divided between a first volume $119v_1$ occupied by phase change material 130 and a second void volume headspace $119v2$. The phase change material 130 is introduced into the chamber 119 through a fill port 120.

Referring to FIGS. 1-4, the panel 110 is a thin, usually rectangular, hollow container having transversely spaced front and back walls 111, 112 that establish a panel thickness, and edges 113 spaced in the longitudinal x and lateral y directions to establish length and width respectively. The edges 113 interface at corners 114. The edges 113 of the panel 100 may be orthogonal to the front and back walls 111, 112, or may be beveled such as a 45° bevel to accommodate effective edge to edge abutment of phase change thermal storage units 100 within a cuboidal passive thermal controlled shipping container 200. The panel 110 defines a central transverse axis 110z.

Figure 5:
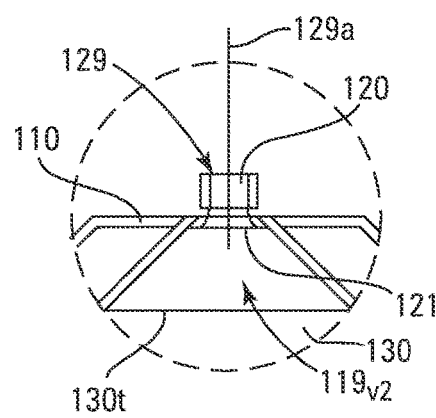
FIG. 5 is an enlarged view of the corner portion of the panel containing the fill port encircled in FIG. 5 with an exaggerated headspace.

Referring to FIGS. 4 and 5, the fill port 120 is located proximate a corner 114 of the panel 110. The fill port 120 preferably extends through an edge 113 of the panel 110 and most preferably extends through a truncated corner 114t of the panel 110. The fill port 120 defines a channel 129 in fluid communication with the chamber 119 defined by the panel 110. The fill port channel 129 defines a linear fill port channel axis 129a which is preferably substantially orthogonal to the panel central transverse axis 110z. Referring to FIG. 4, this configuration and arrangement of the fill port 120 on the panel 110 allows the chamber 119 to be filled with phase change material 130 with a corner 114 of the panel 110 at the apex rather than an entire edge 113 of the panel 110. This minimizes the volume of the void volume headspace $119v2$ created when, in accordance with best practices, a vertical gap of defined distance is left between the top surface 131 of the phase change material 130 and the base 121 of the fill port 120 during manufacture to avoid spillage of phase change material 130 on production equipment and the production floor. Hence, even when observing best practices and leaving a vertical gap of at least 2 mm measured from the base 121 of the fill port 120 to the top surface 131 of the phase change material 130, the invention allows the volume of the void volume headspace $119v2$ can be held below 3%, preferably below 2% of the total volume $119v$ of the chamber 119 and in many instances, depending predominantly upon the size of the total volume $119v$ of the chamber 119, below 1% and even below 0.5% of the total volume $119v$ of the chamber 119.

Figure 3:
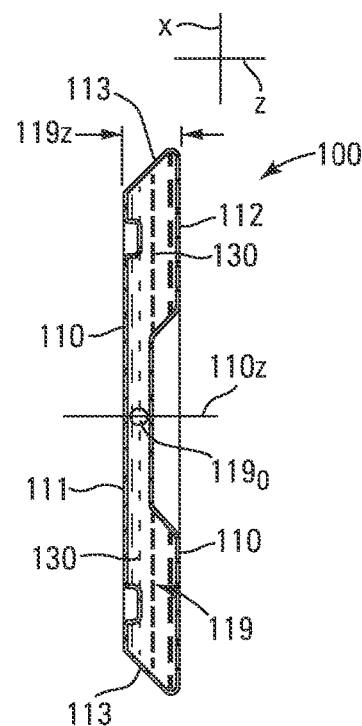
FIG. 3 is a cross-sectional side view of the phase change thermal storage unit depicted in FIG. 1 taken along line 3-3.
Figure 2:
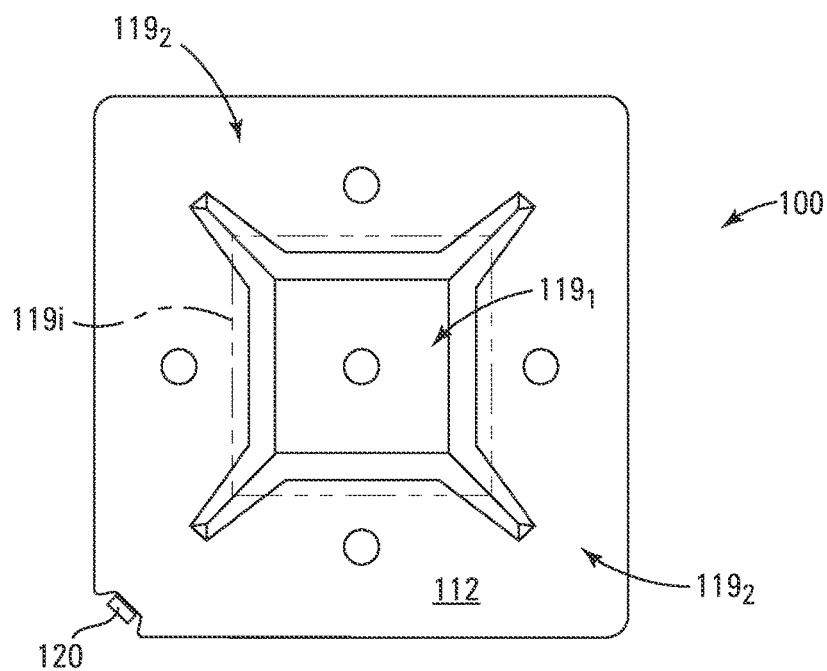
FIG. 2 is a bottom view of the phase change thermal storage unit depicted in FIG. 1 depicting an exemplary phantom boundary line between the central and peripheral portions of the phase change material retaining chamber.

Referring to FIGS. 3 and 4 the panel chamber 119 has a thickness 119z which can be varied by contouring the front 111 and/or back 112 walls of the panel 110 to create a central portion $119_1$ of the chamber 119 proximate a volumetric center $119_0$ of the chamber 119 having an average thickness 119z which is less than the average thickness 119z of a peripheral portion $119_2$ of the chamber 119 proximate the edges 113 of the panel 110. Referring to FIG. 2, the central portion $119_1$ and peripheral portion $119_2$ of the chamber 119 are visualized as separated by an exemplary imaginary boundary 119i.

The average thickness of the chamber 119 within the central portion $119_1$ of the chamber 119 is preferably at least 25% less than the average thickness of the chamber 119 within the peripheral portion $119_2$ of the chamber 119.

The relative maximum thicknesses 119z of the chamber 119 in the central portion $119_1$ and peripheral portion $119_2$ preferably has a ratio of between 1 to 1.5 and 1 to 3. The relative minimum thicknesses 119z of the chamber 119 in the central portion $119_1$ and peripheral portion $119_2$ preferably has a ratio of between 1 to 1 and 1 to 3.

The central portion $119_1$ of the chamber 119 has a central volume and the peripheral portion $119_2$ of the chamber 119 has a marginal volume. The peripheral portion $119_2$ of the chamber 119 preferably extends a given distance inward from the entire longitudinal x and laterally y perimeter of the chamber 119. The given distance is preferably at least 2 inches. The total volume $119v$ of the chamber 119 is preferably divided with 20% of the volume within the central portion and 80% of the volume within the peripheral portion. More preferably, the total volume $119v$ of the chamber 119 is equally volumetrically divided between the central volume and the marginal volume.

Such contouring of the front 111 and/or back 112 walls of the panel 110 is preferably configured and arranged to create restrictions within the chamber 119 operable for delaying gravitational rising of melting ice and gravitation sinking of melting frozen non-aqueous phase change material 130 within the chamber 119 of a vertically upright panel 110 from a peripheral portion $119_2$ of the upright chamber 119 into either the central portion $119_1$ of the upright chamber 119 or a peripheral margin adjacent a different edge 113 of the panel 110.

Referring to FIG. 1, the panel 110 preferably includes fingertip indentation handles 115 in the front wall 111 of the panel 110 proximate each and every edge 113 for facilitating insertion and removal of the phase change thermal storage units 100 into and out from a shipping container 200. Mirror image fingertip indentation handles 115 can also be provided in the back wall 112 of the panel 110. The rotational symmetry about the transverse z axis achieved by providing fingertip indentation handles 115 proximate each and every edge 113 avoids the need for a particular rotational orientation of the units 100 about the transverse z axis when positioned along the sides of a shipping container 200 to ensure accessible location of a fingertip indentation handle 115 at the top of the units 100. The fingertip indentation handles 115 provide additional restrictions within the chamber 119 operable for delaying gravitational sinking of melting frozen non-aqueous phase change material 130. The rotational symmetry of these handles 115 assures this performance enhancing feature is present in all rotational orientations of the panel 110.

Passive Thermal Controlled Shipping Container 200

Figure 6:
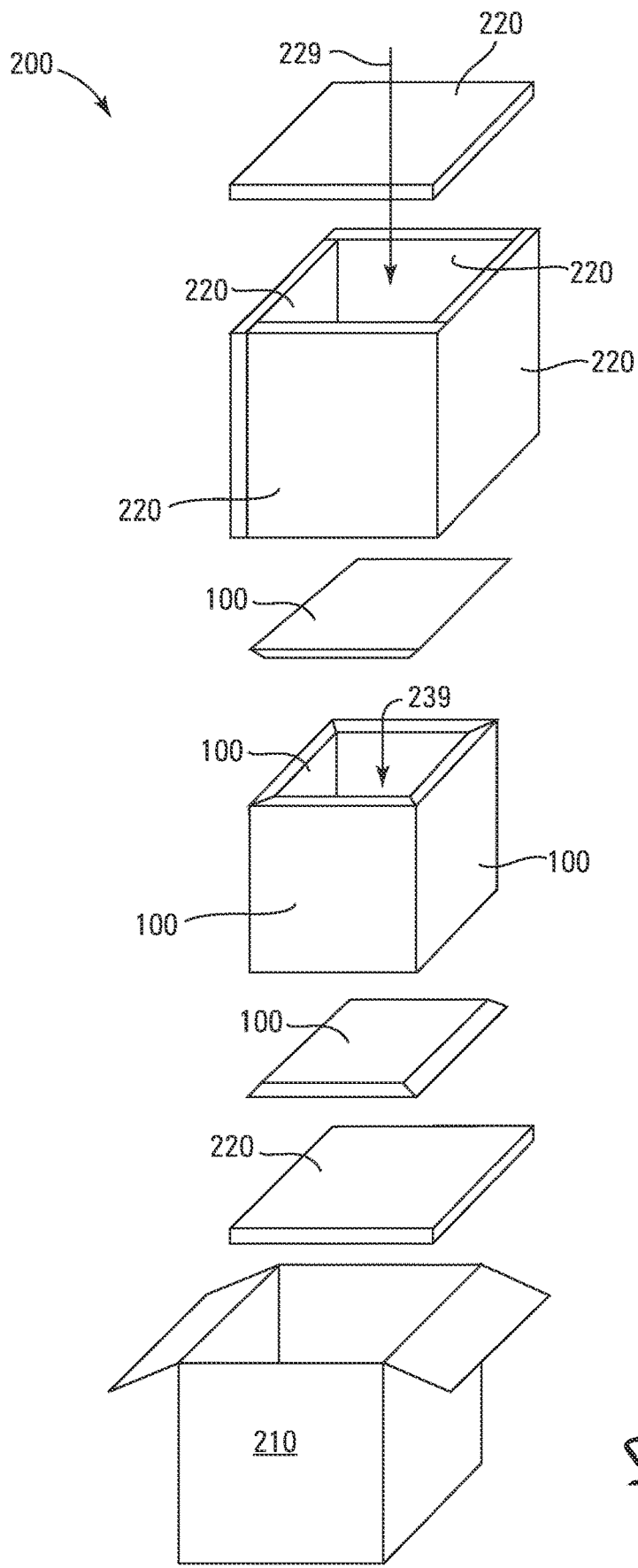
FIG. 6 is an exploded perspective view of one embodiment of a passive thermal controlled shipping container in accordance with the invention.

Referring to FIG. 6, the phase change thermal storage units 100 are particularly suited for use in assembly of a passive thermal controlled shipping container 200.

The shipping container 200 has an outside shell 210, an inner lining of thermal insulation 220 creating a thermally insulated volume 229, and a removable inner lining of the phase change thermal storage units 100 creating a passive thermally controlled payload chamber 239.

The outside shell 210 is made from corrugated cardboard or the like for holding the thermal insulation 220 and phase change thermal storage units 100 in proper conformation surrounding a passive thermally controlled payload chamber 239.

The thermal insulation 220 is inserted snugly into the outer shell 210 as a lining against the walls of the outer shell 210 to form a thermally insulated volume 229. The thermal insulation 220 may be vacuum insulated panels, Styrofoam or the like, or any material having, good insulation qualities, ie., having a high thermal resistance "R-value".

The phase change thermal storage units 100, thermally conditioned into the desired phase (solid for shipping in climates warmer than the target payload chamber temperature and liquid for shipping in climates colder than the target payload chamber temperature), are slid into the thermally insulated volume 229 against the thermal insulation 220 to form a passive thermally controlled payload chamber 239.

The article to be shipped is placed in the passive thermally controlled payload chamber 239 through an access opening in the container 200, a thermal insulation panel 220 and a phase change thermal storage unit 100 placed over the access opening in the payload chamber 239, a lid or cover placed thereover, and the payload containing passive thermally controlled shipping container sealed and shipped.

Method of Filling Panels 110

Referring to FIG. 4, panels 110 having a corner fill port 120 in accordance with the invention are suited for being filled with phase change material 130 by (i) holding the panel 110 in a vertically upright position with the corner 113 of the panel 110 occupied by the fill port 120 at the apex of the panel 110 and the opening of the fill port 120 vertically higher than the entire volume 119$v$ of the chamber 119, (ii) filling the chamber 119 with phase change material 130 through the fill port 120, and the (iii) sealing the opening through the fill port 120.

This technique allows the chamber 119 to be filled with sufficient phase change material 130 to limit the void volume headspace 119$v2$ in the chamber 119 to less than 3%, preferably below 2%, most preferably below 1% and often times even less than 0.5% of the total volume 119$v$ of the chamber 119, while also leaving a safe, no-spill vertical gap of at least 2 mm between the top 130$t$ of the phase change material 130 and the base 121 of the fill port 120.

For many popular applications, the phase change thermal storage unit 100 in accordance with this invention would have a generally cuboidal panel 110 with orthogonal or beveled edges 113 defining a generally cuboidal chamber 119 of less than 3,000 cm$^3$ filled with an amount of a non-aqueous phase change material 130 sufficient to provide a headspace 119$v_2$ within the chamber 119 which is (i) at least 2 mm deep measured from the base 121 of the fill port 120 when the fill port 120 is vertically higher than the entire volume 119$v$ of the chamber 119, and (ii) has a volume 119$v_2$ which is less than 2%, preferably less than 1% and most preferable less than 0.5%, of the total volume 119$v$ of the chamber 119.

The present invention may be embodied in other specific forms without departing from the spirit or essential attributes thereof; and it is, therefore; desired that the present embodiment be considered in all respects as illustrative and not restrictive, reference being made to the appended claims rather than to the foregoing description to indicate the scope of the invention.

We claim:

1. A passive thermal controlled shipping container, comprising:
   (a) a thermally insulated cuboidal shell having six walls that include a selectively openable top wall, a bottom wall and four sidewalls between the top wall and the bottom wall, defining a selectively accessible thermally insulated volume, and
   (b) phase change thermal storage units lining at least two of the sidewalls defining the insulated volume to form a passive thermal controlled payload chamber, wherein each of the phase change thermal storage units comprise:
      (1) a panel (i) having a front wall and a back wall transversely spaced from the front wall, and edges, and (ii) defining a chamber having a transverse thickness, a central portion proximate a volumetric center of the chamber, and a peripheral portion proximate the edges of the panel, the peripheral portion of the chamber divisible into a plurality of peripheral margin chambers each extending the same distance inward from the perimeter of the front wall, each having an average thickness, and each extending along and encompassing the entirety of one of the edges, wherein at least three of the peripheral margin chambers have equivalent average thicknesses;
      (2) a sole phase change material sealingly retained within the chamber; and
      (3) internal contouring of the panel for creating an average thickness of the chamber within the central portion of the chamber which is less than the average thickness of the chamber within the peripheral portion of the chamber.

2. The passive thermal controlled shipping container of claim 1 wherein the chamber defined by each panel is equally volumetrically divided between the central portion and the peripheral portion with the peripheral portion comprising a marginal volume extending a given distance inward from the entire perimeter of the back wall.

3. The passive thermal controlled shipping container of claim 1 wherein the chamber defined by each panel is volumetrically divided with 20% of the volume within the central portion and 80% of the volume within the peripheral portion, with the peripheral portion comprising a marginal volume extending a given distance inward from the entire perimeter of the front wall.

4. The passive thermal controlled shipping container of claim 1 wherein the chamber defined by each panel has an average thickness within the central portion of the chamber that is at least 25% less than the average thickness of the chamber within the peripheral portion of the chamber, and the peripheral portion of the chamber is bounded by a margin extending a given distance inward from the entire perimeter of the front wall.

5. The passive thermal controlled shipping container of claim 4 wherein the given distance is at least 2 inches.

6. The passive thermal controlled shipping container of claim 3 wherein the chamber defined by each panel has a maximum thickness within the central portion and a maximum thickness within the peripheral portion, and the ratio of maximum thickness within the central portion to maximum thickness within the peripheral portion of the chamber is between 1 to 1.5 and 1 to 3.

7. The passive thermal controlled shipping container of claim 3 wherein the chamber defined by each panel has a minimum thickness within the central portion and a minimum thickness within the peripheral portion, and the ratio of minimum thickness within the central portion to minimum thickness within the peripheral portion of the chamber is between 1 to 1 and 1 to 3.

8. The passive thermal controlled shipping container of claim 1 wherein the internal contouring of each panel is configured and arranged to create a restriction within the chamber of each panel operable for delaying gravitational sinking of a melting solid mass of frozen non-aqueous phase change material within the chamber of a vertically upright panel from an uppermost margin of the upright chamber into a central portion of the upright chamber.

9. The passive thermal controlled shipping container of claim 1 wherein the internal contouring of each panel is configured and arranged to create a restriction within the chamber of each panel operable for delaying gravitational sinking of a melting solid mass of frozen non-aqueous phase change material within the chamber of a vertically upright panel from an uppermost margin of the upright chamber into a side margin of the upright chamber.

10. The passive thermal controlled shipping container of claim 1 wherein each panel is rectangular.

11. The passive thermal controlled shipping container of claim 1 wherein the edges of each panel are beveled.

12. The passive thermal controlled shipping container of claim 11 wherein the edges of each panel are beveled at 45°.

* * * * *